(12) United States Patent
Huffer et al.

(10) Patent No.: US 9,162,414 B2
(45) Date of Patent: Oct. 20, 2015

(54) METHOD FOR PREPARING A SCORED FLEXIBLE STRUCTURE, AND METHOD FOR MAKING A FLEXIBLE PACKAGING STRUCTURE HAVING A BUILT-IN OPEN AND RECLOSE FEATURE

(75) Inventors: Scott W. Huffer, Hartsville, SC (US); Rod Pettis, Elgin, SC (US)

(73) Assignee: Sonoco Development, Inc., Hartsville, SC (US)

( * ) Notice: Subject to any disclaimer, the term of this patent is extended or adjusted under 35 U.S.C. 154(b) by 263 days.

(21) Appl. No.: 13/608,360

(22) Filed: Sep. 10, 2012

(65) Prior Publication Data

US 2014/0069923 A1 Mar. 13, 2014

(51) Int. Cl.
| | |
|---|---|
| *B32B 3/08* | (2006.01) |
| *B05D 3/06* | (2006.01) |
| *B31B 19/90* | (2006.01) |
| *B32B 27/00* | (2006.01) |
| *B31D 1/02* | (2006.01) |
| *B65D 75/58* | (2006.01) |

(52) U.S. Cl.
CPC ............... *B31B 19/90* (2013.01); *B31D 1/021* (2013.01); *B31D 1/025* (2013.01); *B31D 1/026* (2013.01); *B32B 27/00* (2013.01); *B65D 75/5838* (2013.01); *B65D 75/5894* (2013.01); *B31B 2219/14* (2013.01); *B31B 2219/9006* (2013.01); *B31B 2219/9012* (2013.01)

(58) Field of Classification Search
CPC .... B32B 27/00; B31B 19/90; B31B 2219/14; B31B 2219/9006; B31B 2219/9012; B31D 1/021; B31D 1/025; B31D 1/026; B65D 75/5833; B65D 75/5894

USPC ......... 428/40.1, 43, 57, 68, 411.1, 221, 35.7, 428/941; 220/268; 493/328, 330; 383/205, 383/207, 208, 209, 211, 66
See application file for complete search history.

(56) References Cited

U.S. PATENT DOCUMENTS

| | | |
|---|---|---|
| 4,643,730 A | 2/1987 | Chen et al. |
| 5,571,586 A | 11/1996 | Gobran |
| 7,244,496 B2 | 7/2007 | Huffer |
| 7,371,008 B2 | 5/2008 | Bonenfant |
| 7,600,641 B2 | 10/2009 | Burgess |
| 7,717,620 B2 | 5/2010 | Hebert et al. |

(Continued)

FOREIGN PATENT DOCUMENTS

WO WO-2010/013218 A1 2/2010

OTHER PUBLICATIONS

International Search Report and Written Opinion for Application No. PCT/US2013/057363; dated Dec. 6, 2013.

*Primary Examiner* — Yan Lan
(74) *Attorney, Agent, or Firm* — Alston & Bird LLP

(57) ABSTRACT

A method for preparing a scored flexible structure that has utility in the construction of packaging structures, including steps of: (i) providing a structure as a web of flexible material; (ii) enhancing a thickness of the structure in a discrete region thereof by applying a substantially all-solids electron-beam-curable polymer material in fluid form onto the discrete region, the discrete region occupying a minor percentage of a total surface area of the structure; (iii) curing the polymer material by irradiating the polymer material with an electron beam, thereby forming an EB-cured polymer region; and (iv) forming a score line through a thickness of the EB-cured polymer region and through the thickness of the structure.

5 Claims, 7 Drawing Sheets

(56) References Cited

U.S. PATENT DOCUMENTS

| | | |
|---|---|---|
| 8,181,783 B2 | 5/2012 | Kakura et al. |
| 2005/0276525 A1* | 12/2005 | Hebert et al. ................. 383/203 |
| 2010/0002963 A1 | 1/2010 | Holbert et al. |
| 2012/0177307 A1 | 7/2012 | Duan et al. |

\* cited by examiner

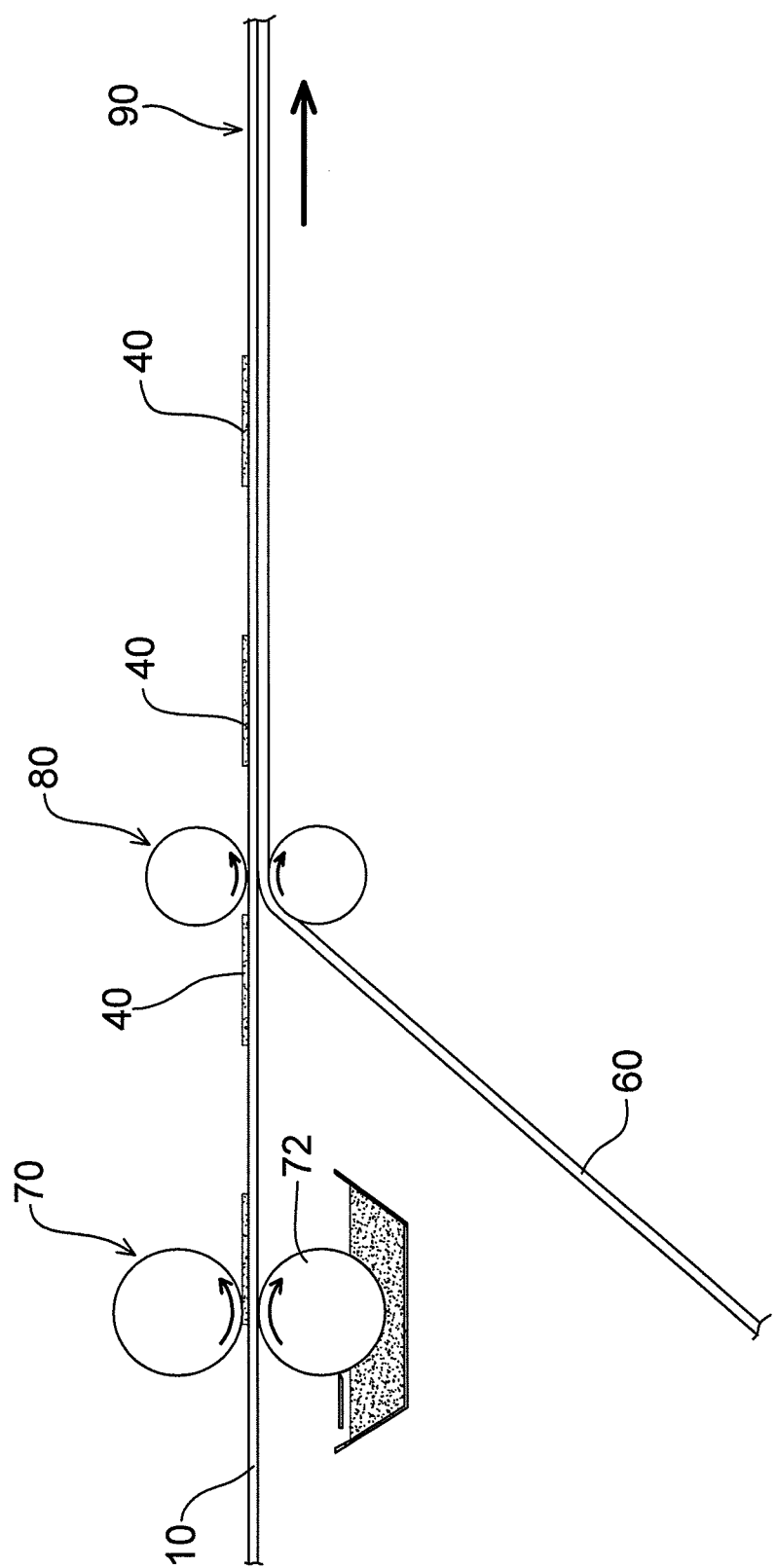

METHOD FOR PREPARING A SCORED FLEXIBLE STRUCTURE, AND METHOD FOR MAKING A FLEXIBLE PACKAGING STRUCTURE HAVING A BUILT-IN OPEN AND RECLOSE FEATURE

BACKGROUND OF THE INVENTION

The present disclosure relates to flexible packaging for products, and particularly relates to methods for making such packaging that is reclosable after initial opening.

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is frequently a desire to be able to reclose a package after its initial opening to keep product that remains in the package fresh.

Various opening and reclose arrangements have been developed for flexible packaging. Often, reclosability is achieved by using a pressure-sensitive adhesive label that is attached to the exterior of the package adjacent the location where the package is opened. Such labels are formed separately from the packaging structure itself and are added to the packaging structure. The labels thus represent additional expense. Furthermore, it is often necessary to ship a roll of the packaging material to a converter for application of the labels, after which the roll is shipped back to the packager for manufacture of the packages. This manufacturing process is inefficient. The use of labels also entails waste in that it is typically necessary to employ a release liner with the labels, which liner is removed and discarded. The labels are usually die cut from a web of material, and the skeleton left over after the die-cutting operation is also wasted.

BRIEF SUMMARY OF THE DISCLOSURE

In accordance with one aspect of the invention, the present disclosure describes a method for preparing a scored flexible structure that has utility in the construction of packaging structures. The method in one embodiment comprises steps of: (i) providing a structure comprising a web of flexible material; (ii) enhancing a thickness of the structure in a discrete region thereof by applying a substantially all-solids electron-beam-curable polymer material in fluid form onto the discrete region, the discrete region occupying a minor percentage of a total surface area of the structure; (iii) curing the polymer material by irradiating the polymer material with an electron beam, thereby forming an EB-cured polymer region; and (iv) forming a score line through a thickness of the EB-cured polymer region and through the thickness of the structure. The score line can be formed using a die cutter.

In one embodiment, the structure is an outer layer of a multi-layer laminate, and the step of forming the score line is performed on the laminate, the die cutter cutting through the thickness of the structure without breaching any other layer of the laminate.

The enhancement of the thickness of the structure with the EB-cured polymer region provides sufficient thickness for reliable die cutting, while the remainder of the structure can have a smaller thickness, thereby saving on material and cost. Unlike prior-art packaging materials employing discrete separately formed labels applied to the structure, the structure formed in accordance with the present method does not necessitate any skeletal waste, which is unavoidable in the formation of discrete labels. Furthermore, unlike prior-art packaging laminates in which the outer structure must have a relatively large uniform thickness throughout in order to provide sufficient thickness for reliable die cutting, the structure in accordance with the present invention can have a significantly smaller thickness because the EB-cured polymer region provides thickness enhancement needed for reliable die cutting.

In accordance with another aspect of the invention, a method is described for making a flexible packaging structure having a built-in open and reclose feature. The method in one embodiment comprises steps of:

(a) providing a first structure comprising a web of flexible material;

(b) providing a second structure comprising a web of flexible material, separate from the first structure;

(c) enhancing a thickness of the first structure in a discrete region thereof by applying a substantially all-solids electron-beam-curable polymer material in fluid form onto the discrete region, the discrete region corresponding to a desired location of the built-in open and reclose feature to be formed, the discrete region occupying a minor percentage of a total surface area of the first structure;

(d) curing the polymer material by irradiating the polymer material with an electron beam, thereby forming an EB-cured polymer region;

(e) forming a first score line through a thickness of the EB-cured polymer region and through the thickness of the first structure so as to create a first flap in the first structure, the first flap being movable out of a plane of the first structure to create an opening through the first structure;

(f) forming a second score line in the second structure so as to create a second flap in the second structure, the second flap being movable out of a plane of the second structure to create an opening through the second structure, the second flap having a smaller footprint than the first flap;

(g) applying adhesive to one side of one of the first and second structures and joining the first and second structures together with the adhesive to form a laminate, wherein the first and second flaps are placed in registration and adhesively joined together so that a marginal region of the first flap extends beyond a periphery of the second flap, and wherein the adhesive includes at least a pressure-sensitive adhesive that is positioned to adhere the marginal region of the first flap to an underlying surface of the second structure.

In one embodiment, step (g) is performed prior to either of steps (e) and (f). Furthermore, step (g) can be performed prior to either of steps (c) and (d). Alternatively, the steps can be performed in the order of (c), (d), (g), (e), and (f). In any of these variations, steps (e) and (f) can be performed either sequentially (i.e., first (e) and then (f), or first (f) and then (e)) or substantially simultaneously.

In one embodiment, the first and second score lines are formed by die cutting.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 2 is a diagrammatic depiction of a further portion of the method, illustrating the lamination of the flexible web of FIG. 1 with a second flexible web to form a laminate;

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
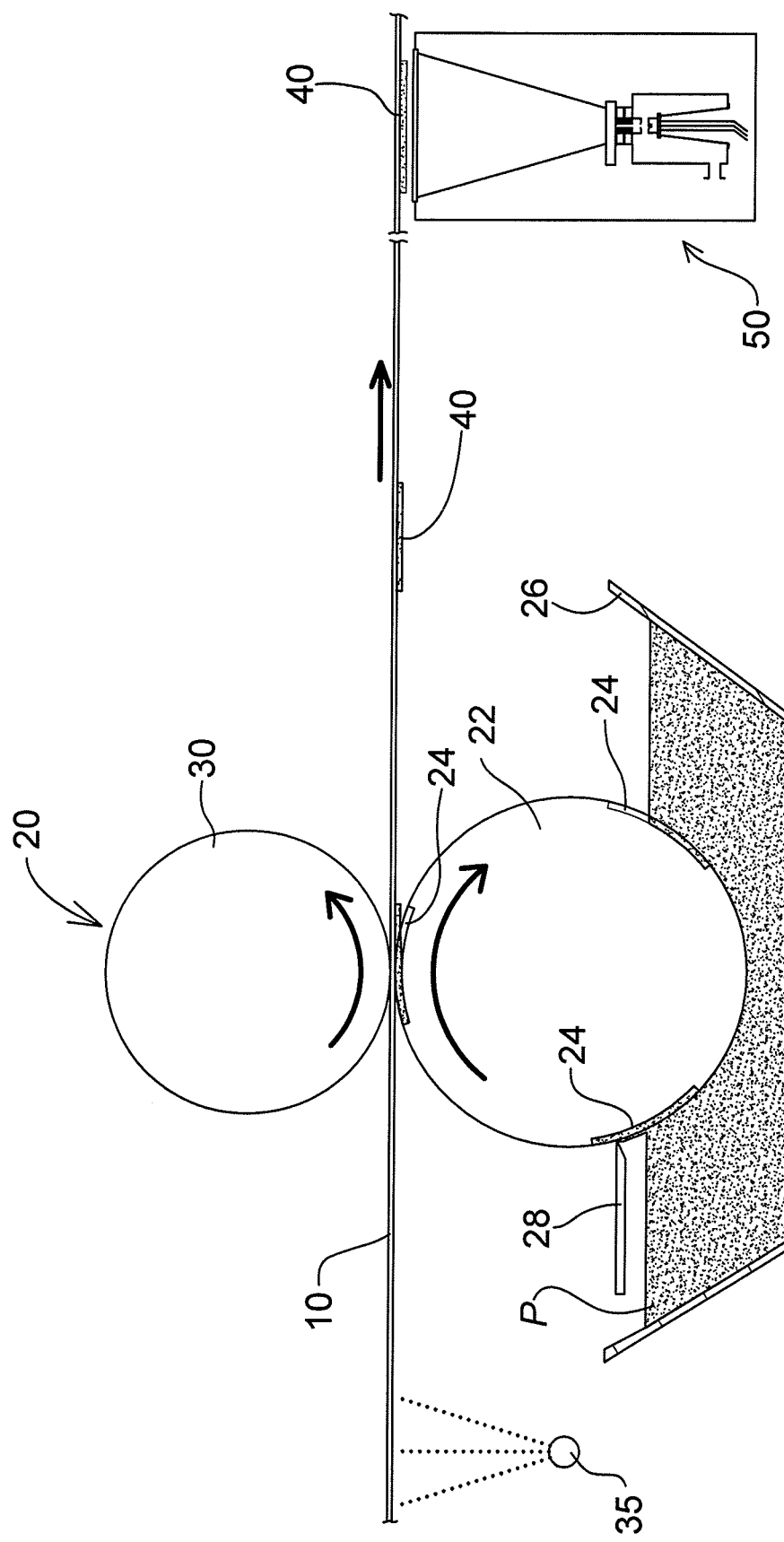
FIG. 1 is a diagrammatic depiction of a portion of a method for preparing a scored flexible structure in accordance with an embodiment of the invention, showing the formation of an EB-cured polymer region on a flexible web.

FIG. 1 diagrammatically illustrates a portion of a method for preparing a scored flexible structure in accordance with an embodiment of the invention. A structure 10 comprising a flexible web of material, such as a polymer film, is drawn from a supply roll (not shown) and advanced to a gravure applicator 20. The applicator 20 comprises a gravure cylinder 22 having an outer surface that is machined or otherwise operated upon to form one or more recesses 24. When there are multiple recesses 24, they are uniformly spaced apart about the circumference of the cylinder, such as the three recesses 24 shown spaced 120 degrees apart in FIG. 1. Each recess 24 has a configuration corresponding to a desired configuration of an electron beam-cured (or "EB-cured") polymer region to be formed on the structure 10. The gravure cylinder 22 is partially submerged in a bath of fluid EB-curable polymer material P contained in a reservoir 26. As the cylinder 22 rotates, each recess 24 picks up and is filled with the polymer material, which also coats the outer surface of the cylinder. A doctor blade 28 scrapes excess polymer material off the outer surface, back into the reservoir. The polymer material in the recess(es) is transferred onto the lower surface of the structure 10, which is pressed against the gravure cylinder 22 by a backing roll 30. As a result, an EB-curable polymer material region 40 is formed on the structure 10. As the structure 10 is advanced through the applicator 20, a series of such EB-curable polymer materials regions 40 are formed on the structure, spaced apart by a uniform distance. The center-to-center spacing of the regions 40 in the length direction of the structure 10 is referred to herein as the "index distance" and corresponds to a length of a discrete packaging sheet made from the structure. The index distance is the length of the sheet necessary to make one package.

Because EB-curable polymer materials typically have a surface energy that exceeds that of most plastic films, it is generally necessary to treat the surface of the plastic film (e.g., by corona or flame treatment) to raise the surface energy of the film, prior to application of the EB-curable polymer.

This is depicted in FIG. 1, where a surface-treatment device 35 is shown for performing an in-line surface treatment on the structure 10. Of course, it is also possible for the structure 10 to be pre-treated as supplied in its supply roll, so that the treatment device 35 would not be included.

After application of the EB-curable regions 40, the regions are cured at an electron beam curing station having an electron beam accelerator 50. The EB-curable polymer material is a polymer composition that is susceptible to being cross-linked when irradiated by a beam of electrons emitted from the accelerator 50. EB-curable polymer materials are solvent-free and are substantially all solids, resulting in the substantial elimination of volatile emissions during curing, and very low shrinkage of the material. This means that if a 10-micron thick layer of fluid polymer material is applied to a substrate, the final thickness of the cured material will be substantially 10 microns. There are various known EB-curable polymer materials that can be used in the practice of the invention.

Figure 1A:
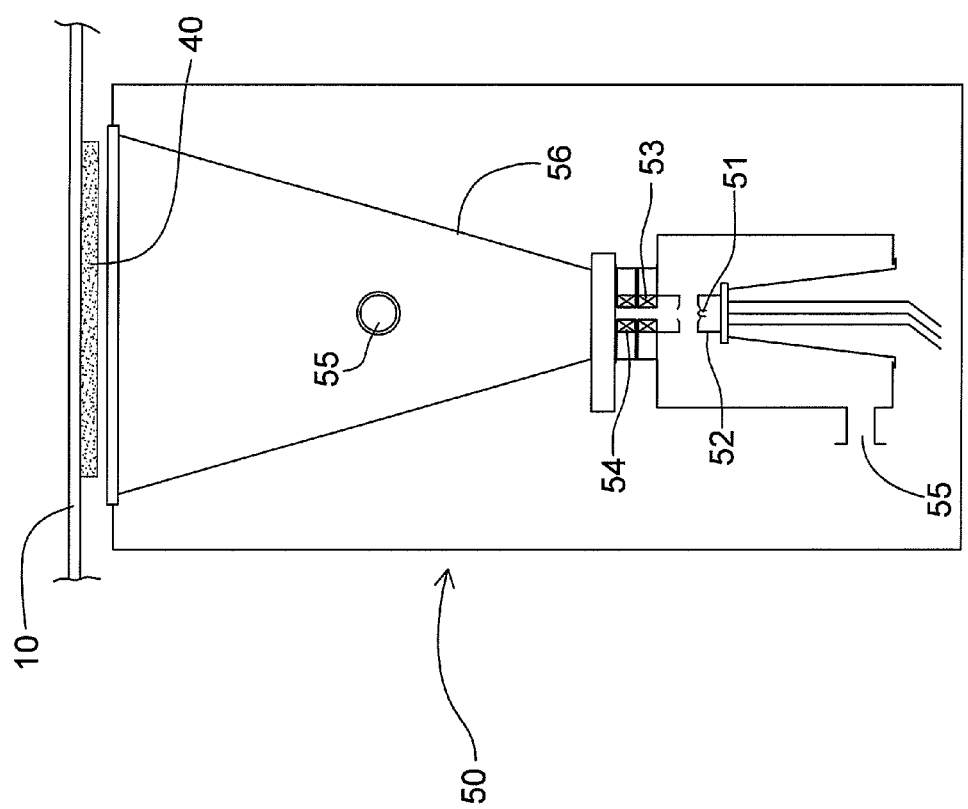
FIG. 1A shows the electron beam accelerator in schematic fashion.

As shown in greater detail in FIG. 1A, the electron beam accelerator 50 comprises a hot cathode 51 that is heated to create a stream of electrons via thermionic emission, a Wehnelt cylinder 52 generating an electric field that focuses the beam of electrons, one or more anode electrodes 53 that accelerate and further focus the electrons, and one or more anode electrodes 54 that deflect the beam of electrons. A large voltage between the cathode and anode accelerates the electrons. The accelerator's interior is evacuated via vacuum connections 55 so that a near perfect vacuum exists in the interior. A scanner 56 having a window 57 operates to scan the beam rapidly back and forth across the material being irradiated.

Thus, the structure 10 emerges from the curing station with a series of longitudinally spaced EB-cured polymer regions 40 disposed on one surface. As shown in FIG. 2, a next step in the process for preparing a scored flexible structure is to laminate the structure 10 with a second structure 60, such as a second polymer film. Accordingly, an adhesive is applied to the surface of one of the two structures, using an adhesive applicator 70. In the example shown in FIG. 2, the adhesive is applied to the surface of the structure 10 opposite from the surface having the EB-cured polymer regions 40. Alternatively, the adhesive could be applied to the surface of the second structure 60 that will oppose the structure 10. The adhesive comprises at least a pressure-sensitive adhesive (PSA), which can be applied either to the entire surface of the structure or to a discrete region of the surface via a pattern-applicator such as a gravure cylinder. Where the PSA is pattern-applied to only a portion of the surface, a second adhesive applicator (not shown) can be employed to apply a permanent adhesive to the portions of the surface not covered by the PSA. This is further described below in connection with the description of FIGS. 5 and 6.

After application of the adhesive(s), the structures 10 and 60 are laminated together at a lamination station 80, thus forming a laminate 90 having a series of EB-cured polymer regions 40 longitudinally spaced along the laminate.

It will be understood that the laminating step could be performed prior to the process shown in FIGS. 1 and 1A, such that the EB-cured polymer regions 40 would be formed on the upper structure of the laminate.

Figure 3:
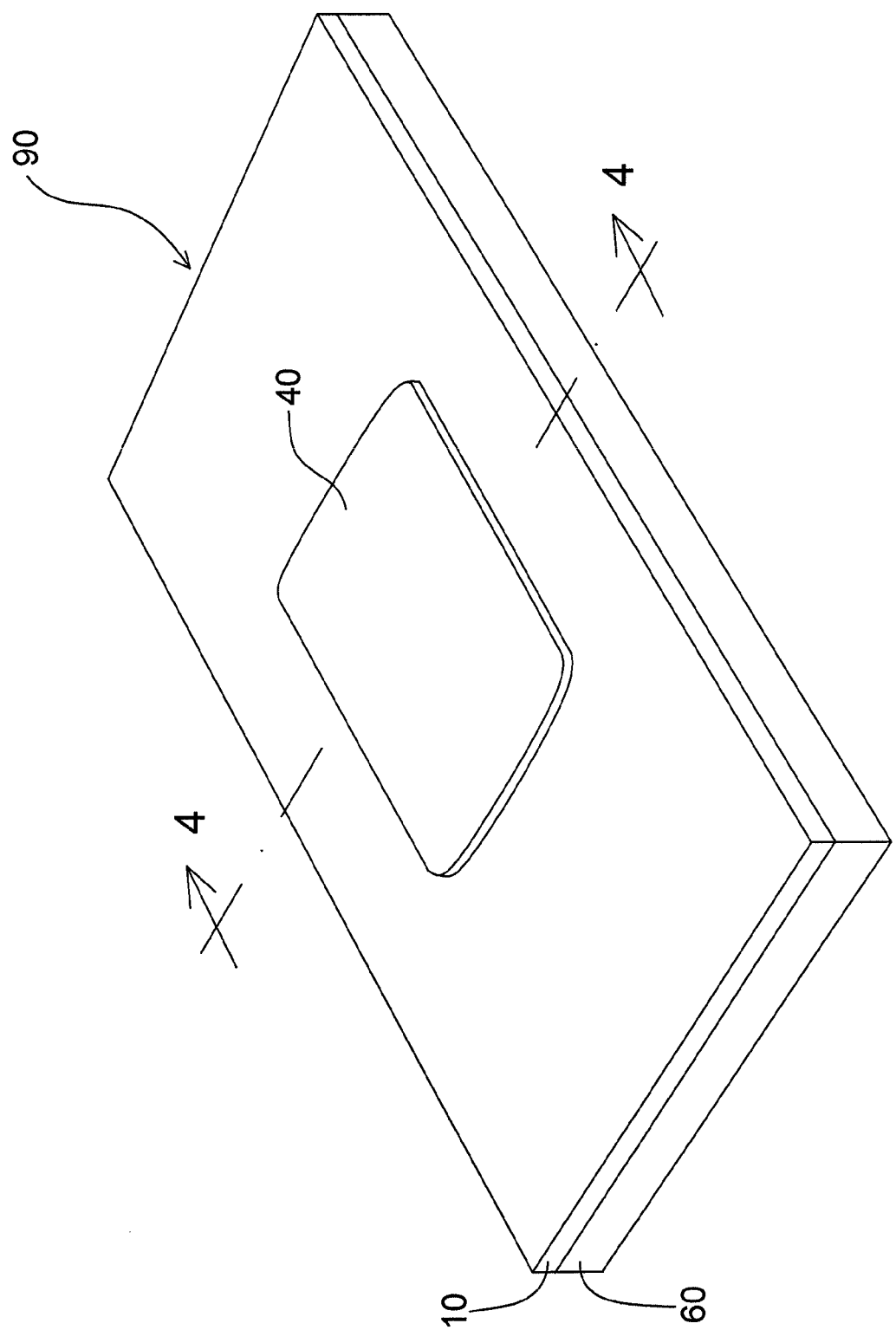
FIG. 3 is a schematic perspective view of a laminate made in accordance with FIGS. 1 and 2.
Figure 4:
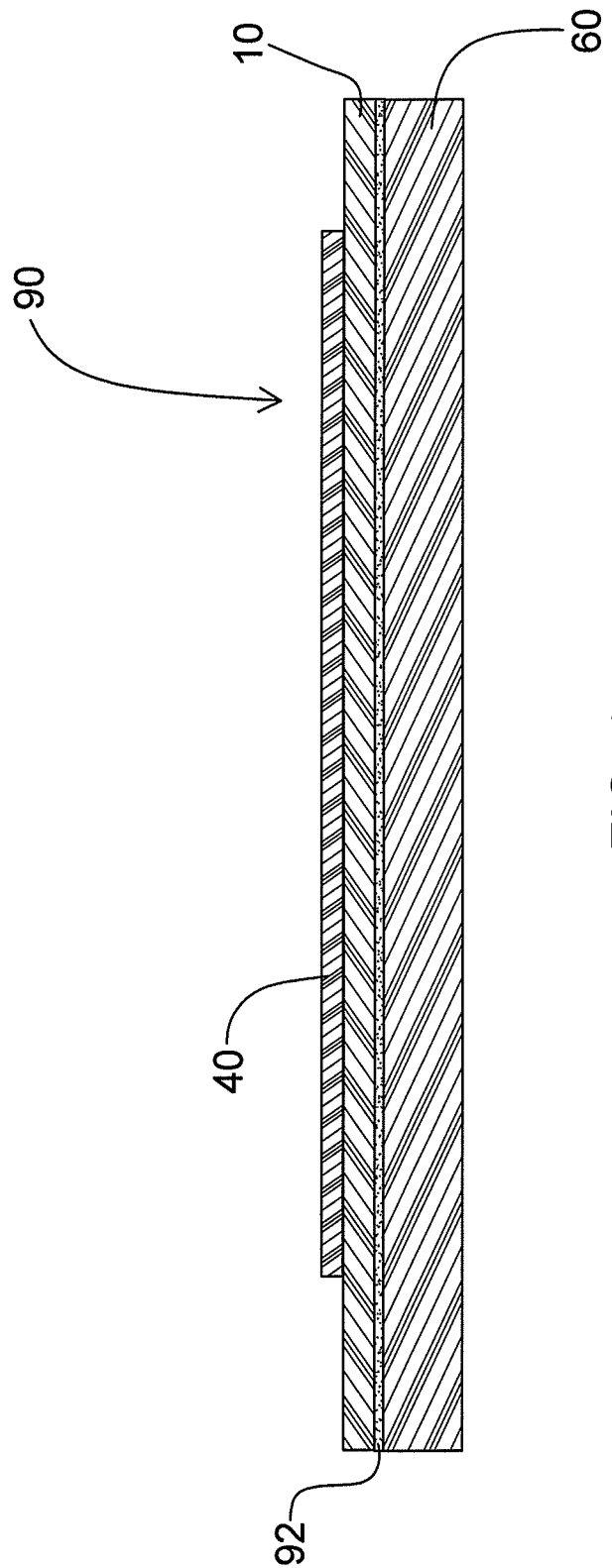
FIG. 4 is a cross-sectional view along line 4-4 in FIG. 3.

In any case, the result is a continuous web of laminate, which can be cut into discrete lengths each of which can be used for forming a package. FIG. 3 illustrates a discrete length of laminate 90, consisting of a first or upper structure 10 having an EB-cured polymer region 40 on its outer surface, and a second or lower structure 60 adhesively joined to the first structure. FIG. 4 is a cross-sectional view through the laminate 90. An adhesive layer 92 is disposed between the structures 10 and 60. In the example shown in FIG. 4, the adhesive layer 92 is a full-coverage layer of PSA.

Figure 5:
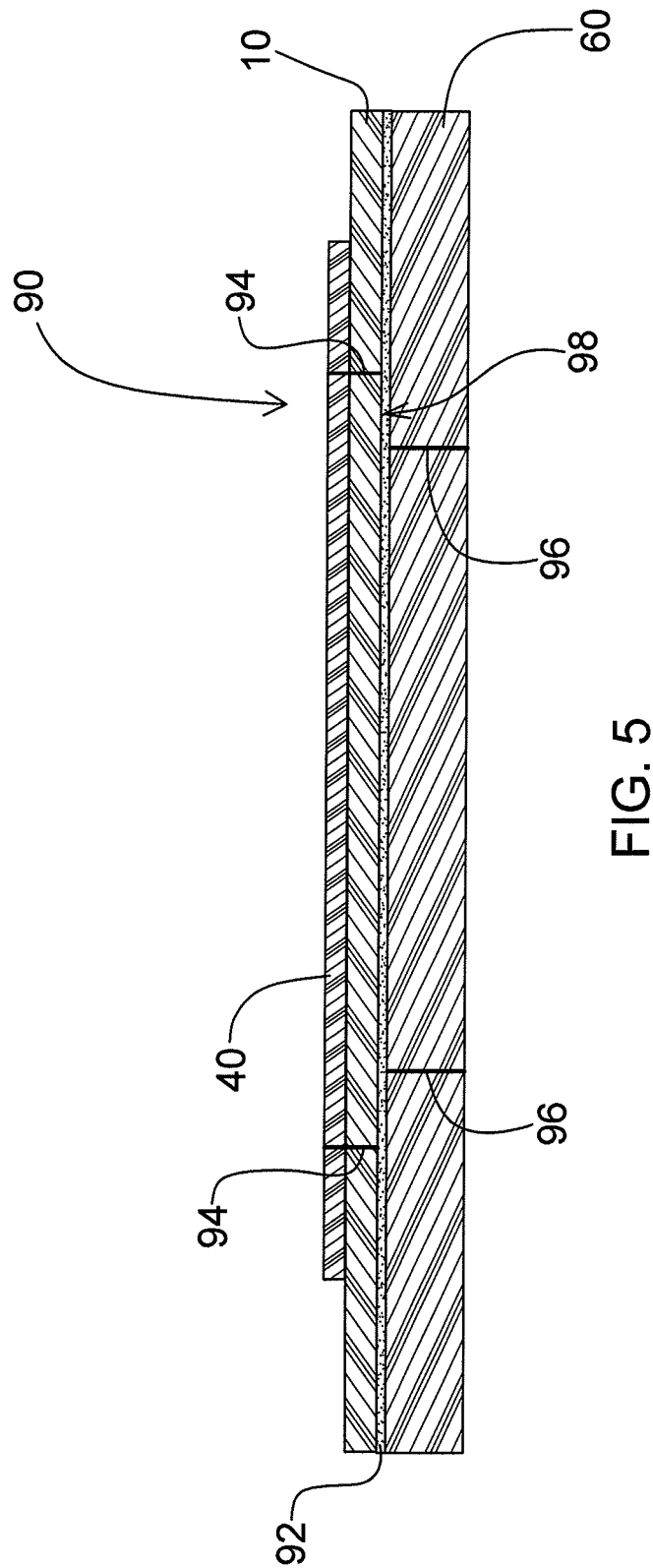
FIG. 5 is a view similar to FIG. 4, but additionally depicting a first score line formed through the thickness of the EB-cured polymer region and through the thickness of the first or upper structure, and an offset second score line formed through the thickness of the second or lower structure of the laminate.
Figure 6:
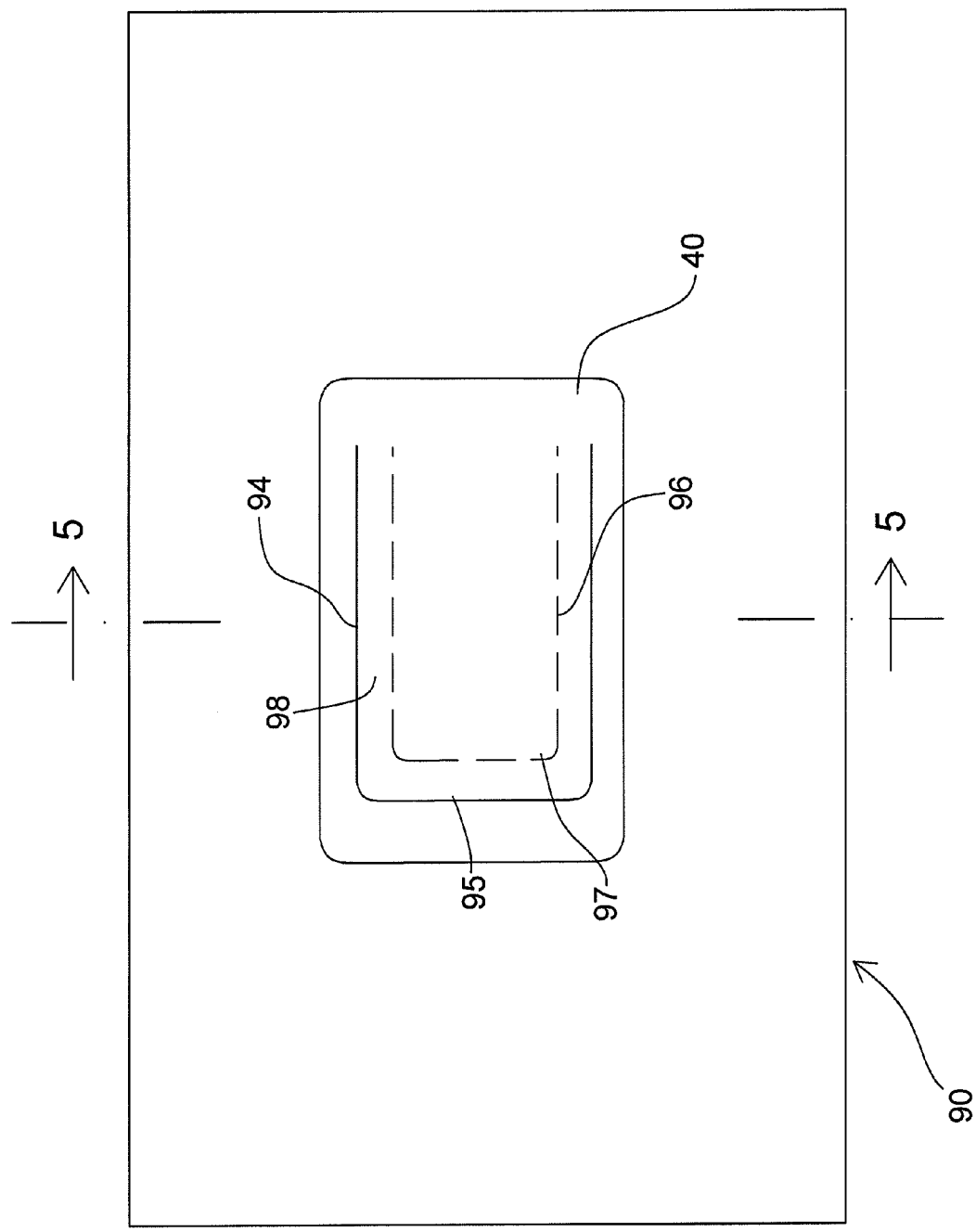
FIG. 6 is a schematic top view of the laminate of FIG. 5.

A next step in a process of preparing a scored flexible structure is illustrated in FIG. 5, which depicts the cross-sectional view of the laminate 90 after the formation of score lines, and FIG. 6, which shows a top view of the laminate. A first or outer score line 94 is formed through the thickness of the EB-cured polymer region 40 and through the thickness of the first structure 10. A second or inner score line 96 is formed through the thickness of the second structure 60. The two score lines are offset from each other. In the particular example shown in FIG. 6, each of the score lines is generally U-shaped, such that the first score line 94 forms a first flap 95 in the first structure 10 and the second score line 96 forms a second flap 97 in the second structure. The second flap 97 has a smaller footprint than the first flap 95, such that there is a marginal region 98 of the first flap 95 that extends beyond the periphery of the second flap 97. The two flaps 95 and 97 will remain adhered to each other by the adhesive 92, and can be lifted out of the plane of the laminate (upwardly in FIG. 5) to create an opening therethrough. When the flaps are lifted, the marginal region 98 of the first flap will detach from the underlying surface of the second structure 60, and the PSA present in that marginal region will remain adhered either to the marginal region 98 of the first flap 95 or to the underlying surface of the second structure 60, depending on which of those two surfaces has a greater affinity to bonding with the PSA. In any case, the first flap can be reattached via the PSA to close the opening through the laminate.

The surface of the first structure 10 facing the second structure 60 can be treated PSA such that the PSA tends to remain adhered to the marginal region 98 of the first flap and to detach from the underlying surface of the second structure when the flaps are peeled back. Alternatively, the first structure 10 can be provided to be formed of a material that already has a greater bonding affinity to the PSA than does the second structure 60, such that the PSA tends to remain adhered to the marginal region 98 of the first flap and to detach from the underlying surface of the second structure when the flaps are peeled back.

The laminate 90 can be constructed generally in accordance with commonly owned U.S. Pat. No. 7,717,620 issued on May 18, 2010, the entire disclosure of which is hereby incorporated herein by reference, and can be used for constructing packages as described therein. In particular, the dual-adhesive construction (pattern-applied permanent adhesive and pattern-applied PSA) as described in the '620 patent can also be used with laminates constructed in accordance with the present invention. In such a dual-adhesive construction, the PSA would be present only in the marginal region 98 and the remainder of the surfaces of the structures 10 and 60 would be joined by permanent adhesive.

The present invention has potential application in a variety of usages where there is a need to form a die cut score line through a thin structure such as a thin plastic film. Precision die cutting of a plastic film to the proper depth is made more difficult as the film thickness decreases. By providing an EB-cured polymer region on the film where the score line is to be formed, the thickness is enhanced so that proper die cutting operation can be attained. At the same time, an overall material saving is realized because the film itself can be thicker than it would otherwise have to be in order for proper die cutting to occur.

The method of the invention can be employed with flexible structures of various compositions, including but not limited to films made of any of the following: polyethylene, polypropylene, polyester (e.g., polyethylene terephthalate or PET), polyvinylidene chloride (PVDC), ethylene vinyl alcohol copolymer (EVOH), polyamide, and the like. The film may be oriented uniaxially or biaxially, and/or may be metallized with a very thin coating of metal such as aluminum.

In the laminate 90 depicted in FIGS. 5 and 6, one exemplary construction having utility for making packages with a built-in open and reclose feature comprises a first or outer structure 10 of PET or oriented polypropylene (OPP), and a second or inner structure 60 of OPP. The outer film can have a thickness of about 50 to 60 gauge, and the inner film can have a thickness of about 90 to 100 gauge.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible packaging structure having a built-in open and reclose feature, comprising:

a laminate comprising a first structure adhesively laminated to a second structure, the first structure comprising a web of flexible material and the second structure comprising a web of flexible material;

an EB-cured polymer region formed on the first structure for enhancing a thickness of the first structure in a discrete region thereof, the discrete region occupying a minor percentage of a total surface area of the first structure and corresponding to a desired location of the built-in open and reclose feature to be formed, the EB-cured polymer region being formed by applying a substantially all-solids electron-beam-curable polymer material in fluid form onto the discrete region and curing the polymer material by irradiating the polymer material with an electron beam, wherein the EB-cured polymer region is applied to a surface of the first structure opposite a surface of the first structure to which the second structure is laminated;

a first score line formed through a thickness of the EB-cured polymer region and through the thickness of the first structure so as to create a first flap in the first structure, the first flap being movable out of a plane of the first structure to create an opening through the first structure;

a second score line formed in the second structure so as to create a second flap in the second structure, the second flap being movable out of a plane of the second structure to create an opening through the second structure, the second flap having a smaller footprint than the first flap;

wherein the first and second flaps are placed in registration and adhesively joined together so that a marginal region of the first flap extends beyond a periphery of the second flap, and wherein the adhesive includes at least a pressure-sensitive adhesive that is positioned to adhere the marginal region of the first flap to an underlying surface of the second structure.

2. The flexible packaging structure of claim 1, wherein each of the first and second score lines is formed to be generally U-shaped such that each of the first and second flaps remains attached to the laminate along a hinge extending between legs of the respective score line.

3. The flexible packaging structure of claim 1, wherein a surface of the first structure facing the second structure is treated with a corona or flame treatment to enhance bonding affinity with the pressure-sensitive adhesive such that the pressure-sensitive adhesive tends to remain adhered to the marginal region of the first flap and to detach from the underlying surface of the second structure when the flaps are peeled back.

4. The flexible packaging structure of claim 1, wherein the first structure is provided to be formed of a material that has a greater bonding affinity to the pressure-sensitive adhesive than does the second structure, such that the pressure-sensitive adhesive tends to remain adhered to the marginal region of the first flap and to detach from the underlying surface of the second structure when the flaps are peeled back.

5. The flexible packaging structure of claim 4, wherein the first structure is provided to be formed of polyester and the second structure is provided to have a layer of polyolefin forming the underlying surface to which the pressure-sensitive adhesive is attached and re-attached.

\* \* \* \* \*